April 29, 1958   F. E. J. VAUGHAN   2,832,456
LONG PAPER FEEDING MECHANISM FOR RECORD
CONTROLLED MACHINES
Filed March 19, 1956                           7 Sheets-Sheet 1
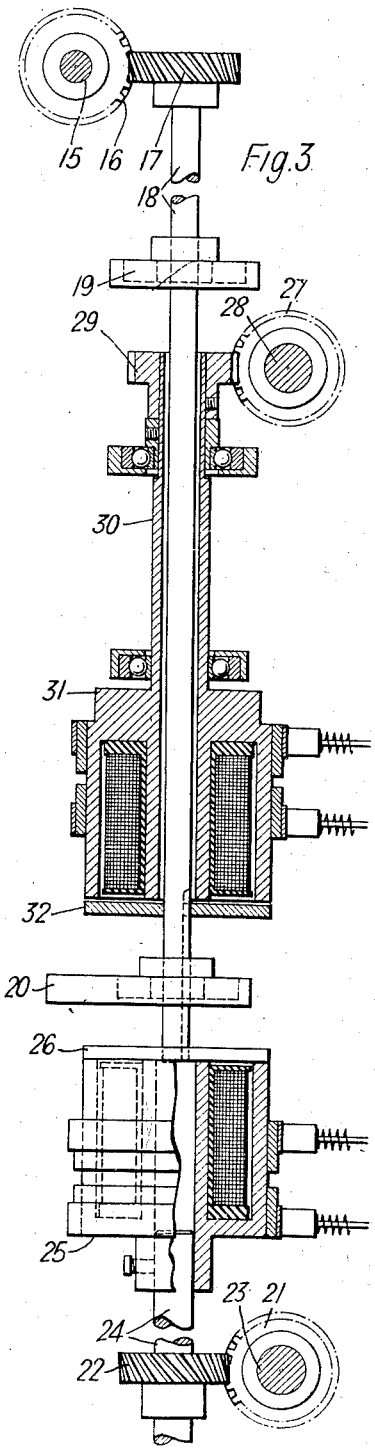
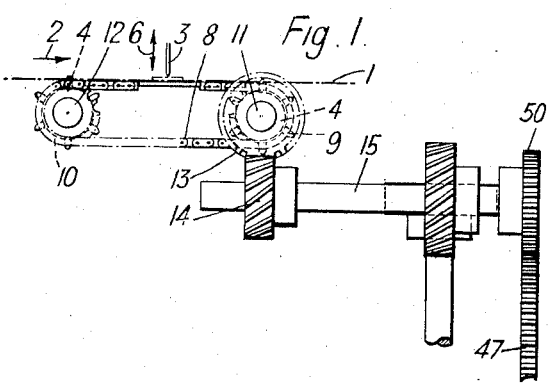
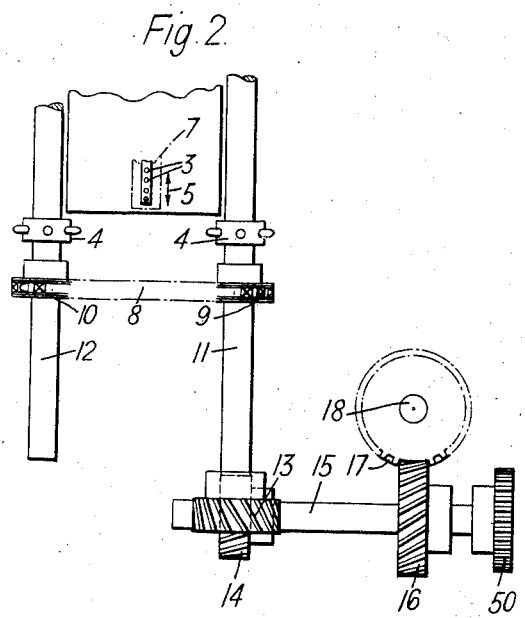
Inventor
FRANK E. J. VAUGHAN
By
Attorney

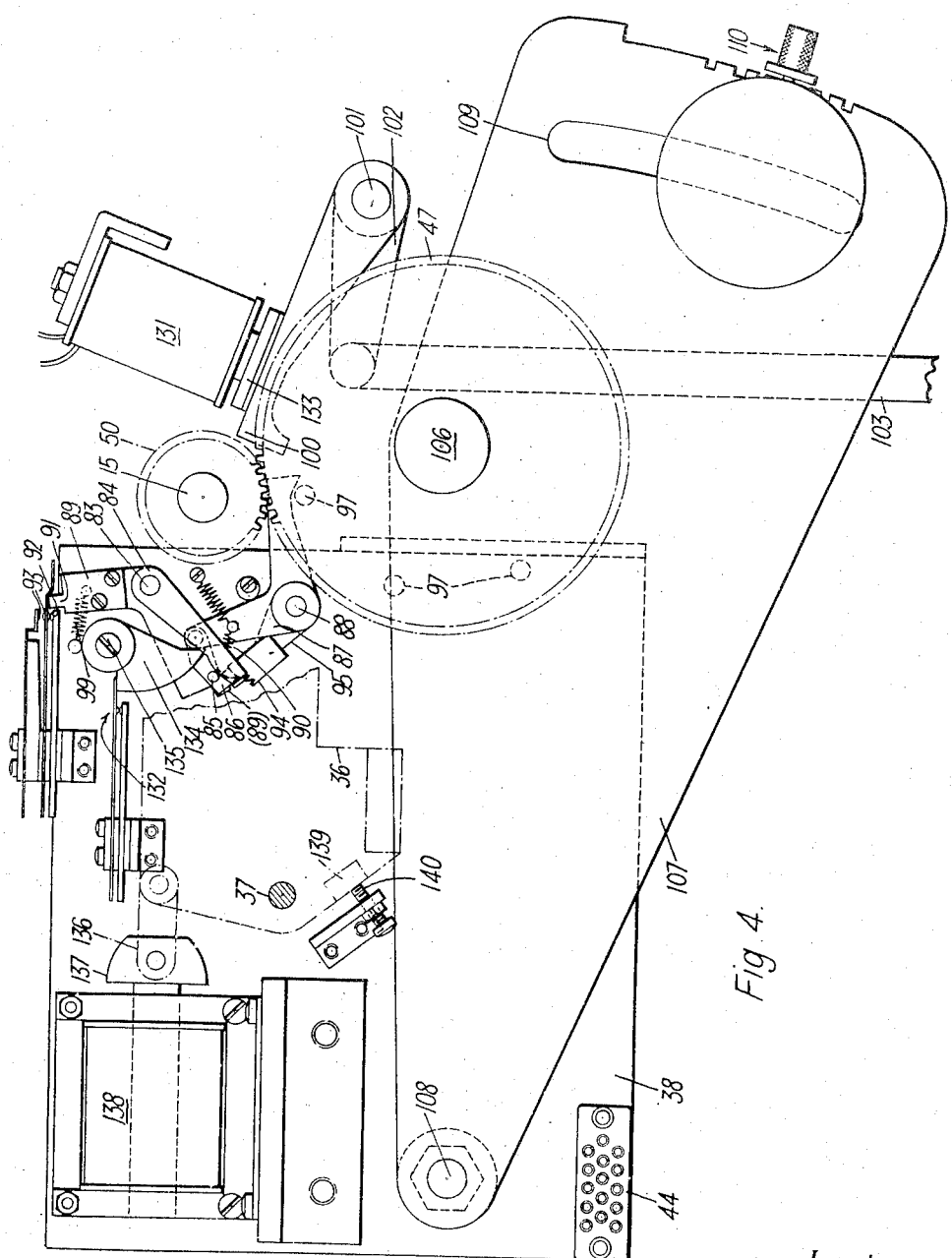

April 29, 1958 F. E. J. VAUGHAN 2,832,456
LONG PAPER FEEDING MECHANISM FOR RECORD
CONTROLLED MACHINES
Filed March 19, 1956 7 Sheets-Sheet 3
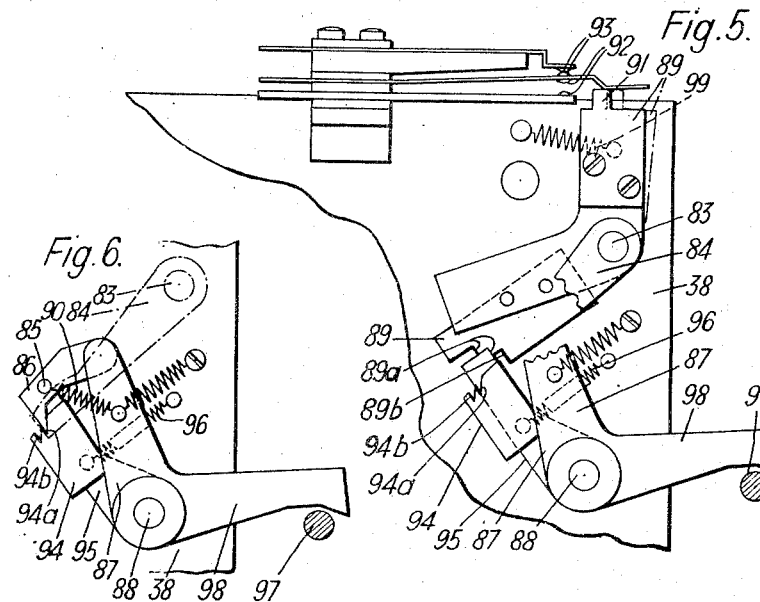
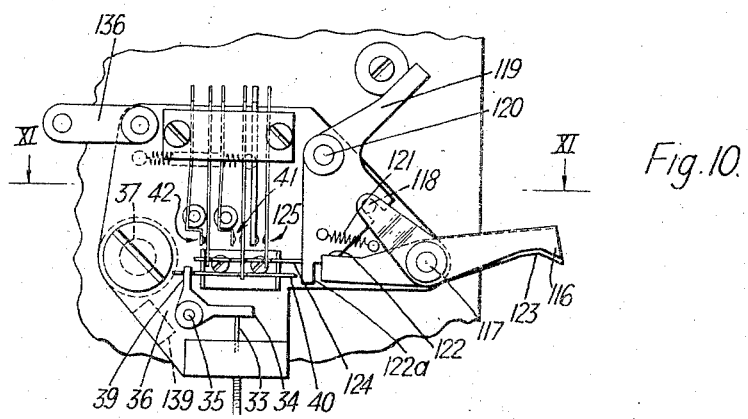
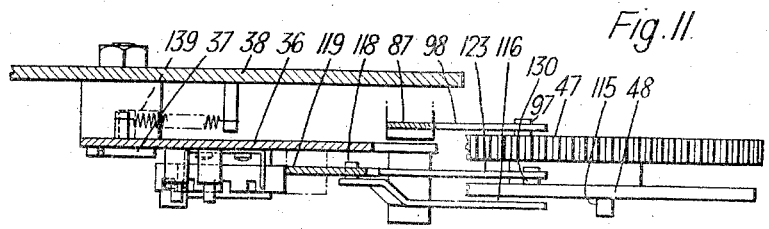
Inventor
FRANK E.J. VAUGHAN
By April 29, 1958 F. E. J. VAUGHAN 2,832,456
LONG PAPER FEEDING MECHANISM FOR RECORD
CONTROLLED MACHINES
Filed March 19, 1956 7 Sheets-Sheet 4
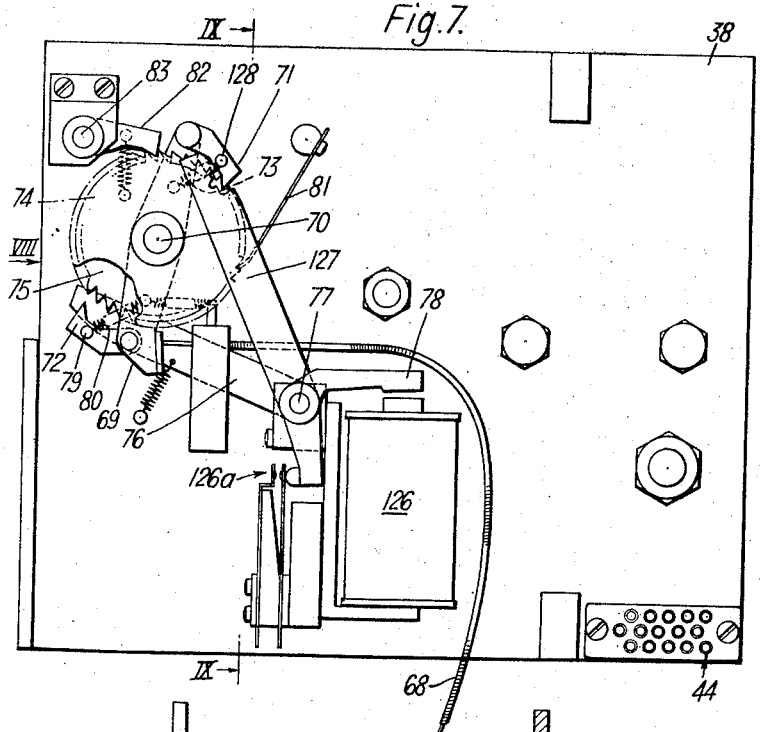
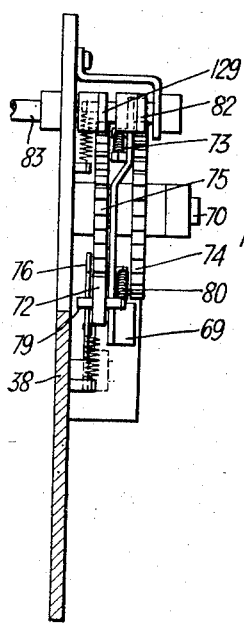
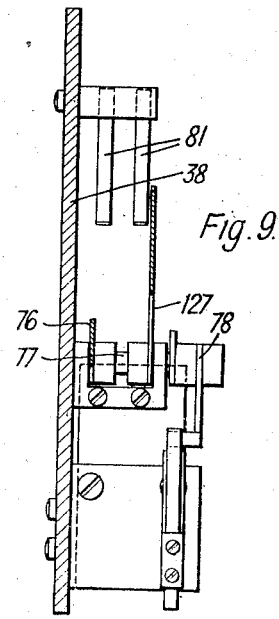
Inventor
FRANK E. J. VAUGHAN
By
Attorney April 29, 1958 F. E. J. VAUGHAN 2,832,456
LONG PAPER FEEDING MECHANISM FOR RECORD
CONTROLLED MACHINES
Filed March 19, 1956 7 Sheets-Sheet 5

Inventor
FRANK E. J. VAUGHAN
By

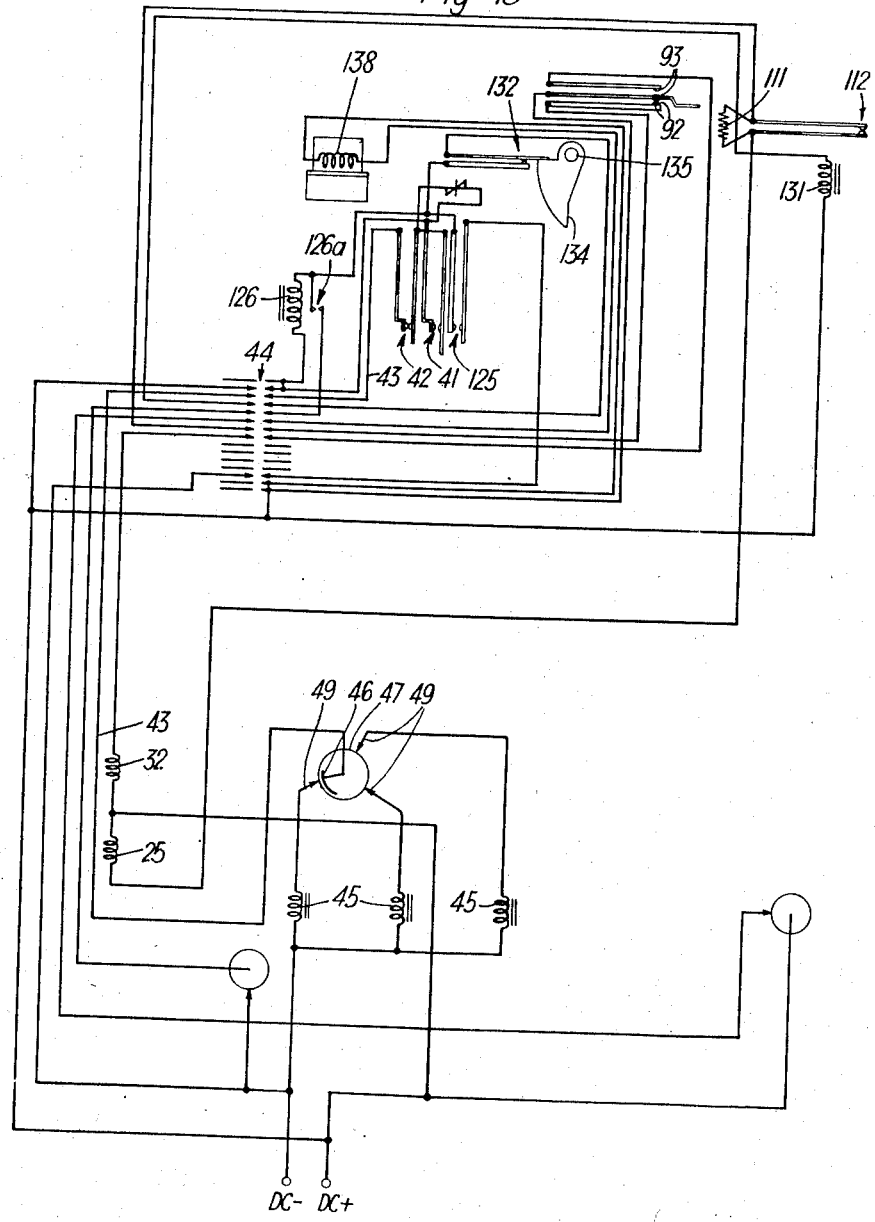

United States Patent Office 2,832,456
Patented Apr. 29, 1958

2,832,456

LONG PAPER FEEDING MECHANISM FOR RECORD CONTROLLED MACHINES

Frank Edward John Vaughan, Thornton Heath, England, assignor to Powers-Samas Accounting Machines Limited, London, England, a British company Application March 19, 1956, Serial No. 572,281

Claims priority, application Great Britain April 28, 1955

24 Claims. (Cl. 197—133)

This invention relates to record controlled machines and in particular to machines such as tabulating or other machines in which imprinting operations are performed and the present invention has special reference to long feeding mechanism for use in such machines.

As is well understood, in record controlled machines which perform imprinting operations, imprinting is often effected on continuous stationery divided into form lengths and, in many instances, a customer's name and address is imprinted, under record control, on each form above a list of items which are also imprinted under record control. The controlling record may comprise a perforated or other form of record card or it may comprise a tape. When the last item of an account has been imprinted the total is printed below it. The name and address is usually spaced from the first of the list of items and the last item of the list of items is usually spaced from the total and these spaces are formed by a paper-feeding operation known as a long feed, the length of the long feed being predetermined according to the space required. A further occasion when a long feed is required is when the paper is to be fed from one form to the next either to move the paper to the first address line position of said next form or, if said next form is to be in continuation of the preceding form, to the first item line of the next form.

Long feed mechanisms have long been known for use with machines in which imprinting is effected while the paper is stationary, but such machines are relatively slow in operation and one of the difficulties encountered in endeavouring to design such machines to operate at higher speeds is that of preventing over-running at the end of a long feed operation during which the paper is fed at a linear speed greater than that at which it is fed between successive lines of imprinting operations, and it is one object of the present invention to provide a long paper feeding mechanism for use in machines effecting imprinting at a relatively high speed, for example at a speed of 400 or more lines per minute, the long feed mechanism being provided with means to avoid over-running of the paper at the termination of a long feed thereby to ensure that after a long feed operation has been effected the next line-imprinting occurs at the desired position on the paper.

A further object of the present invention is to provide a long paper feeding mechanism for use with imprinting mechanism in which the paper is continuously advanced during each imprinting operation, the linear speed of the paper during an imprinting operation being so related to the operation of the imprinting elements that it defines one maximum dimension, for example the height, of the characters being imprinted on the paper.

According to the present invention there is provided long paper feeding mechanism for record controlled machines, wherein a rotatable drive shaft is normally coupled to a first driving means to impart normal feeding movements to paper feeding elements and under control of long feed initiating means is coupled to a second driving means for an interval determined by a timing device and during which the paper is fed at a linear speed greater than that during movement thereof by the first driving means thereby to effect a long feed, the timing device on termination of a long feed effecting operation of the long feed initiating means thereby to uncouple the driving shaft from the second driving means and to recouple it with the first driving means. The long feed initiating means may be conditioned to effect a long feed operation under control of a record controlled signal or of a signal initiated by the timing device.

Further according to the present invention there is provided long paper feeding mechanism for record controlled machines in which paper feeding means is operative to move a web of paper at a constant linear speed during definition of characters thereon, wherein the paper feeding means is driven by a drive shaft rotatable selectively at one or other of two angular velocities of which the first determines the rate of linear movement of the web during character definition and the second is greater than that of the first and determines the rate of linear movement of the web during a long feed thereof.

Still further according to the present invention there is provided long paper feeding mechanism for record controlled machines, wherein a rotatable drive shaft is normally clutched to a first driving means to impart movement to paper feeding elements thereby to effect movement of paper at a predetermined linear speed and under control of a long feed initiating device is clutchable to a second driving means for an interval determined by a timing device thereby to effect a long feed by movement of the paper feeding elements at a rate which increases the linear speed of the paper, said timing device on termination of a long feed being arranged to effect operation of the long feed initiating device thereby to reclutch the drive shaft to the first driving means and co-operating with selectively operable stop means to arrest movement of the paper feeding elements for an interval during which the first driving means is rendered fully effective to cause movement of the paper feeding elements at said predetermined linear speed of the paper.

In order that the invention may be clearly understood, one embodiment thereof will now be described, by way of example, with reference to the accompanying drawings in which:

Figure 1 illustrates diagrammatically in elevation one form of paper feeding mechanism to be controlled by mechanism according to the invention;

Figure 2 is a top plan of Figure 1;

Figure 12:
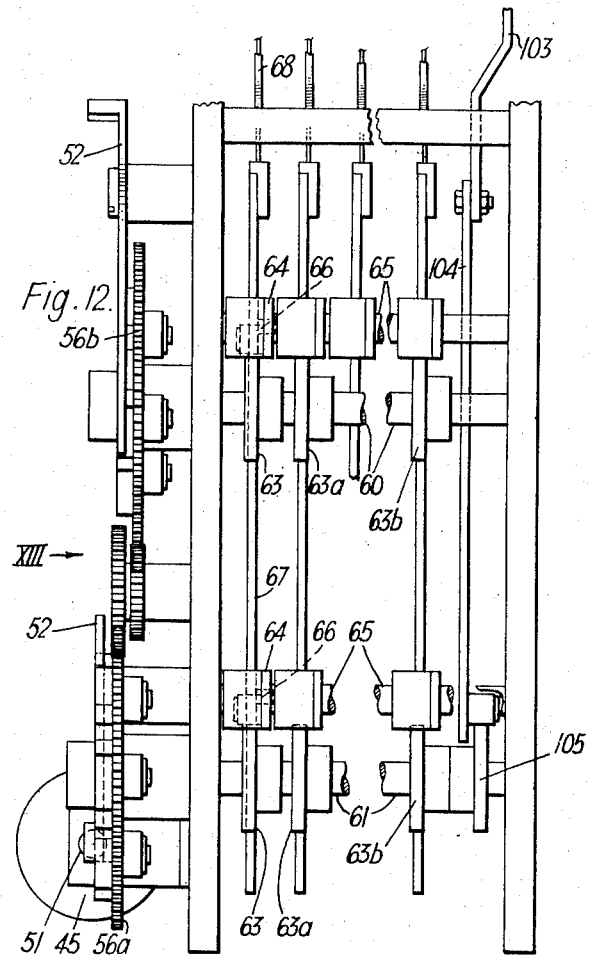
Figure 14:
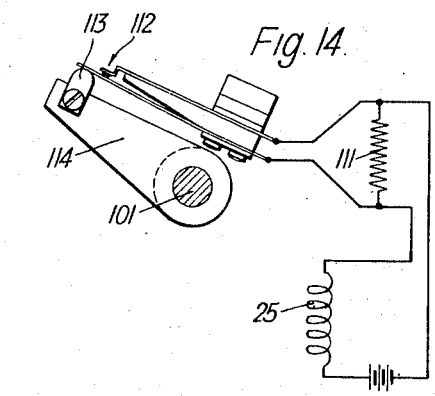
Figure 13:
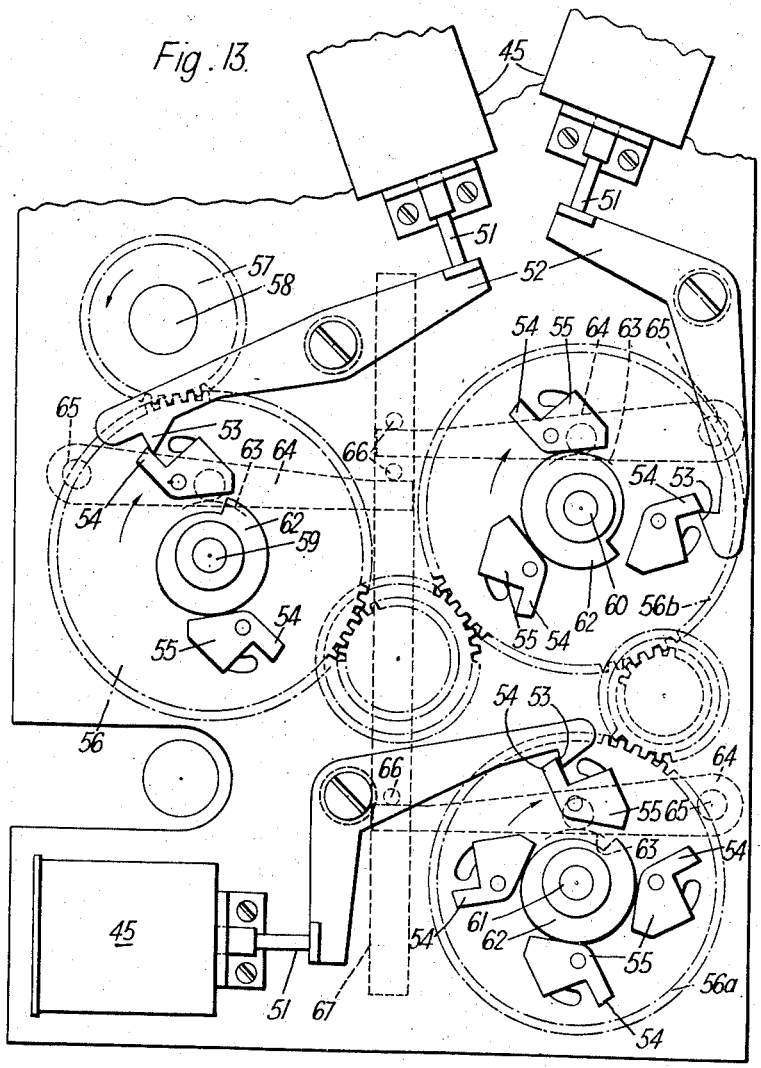

Figure 3 in section illustrates the driving mechanism for the paper feeding device;

Figure 4 illustrates a part of the mechanism according to the invention for controlling long feed operations;

Figures 5 and 6 are views illustrating a part of the mechanism shown in Figure 4, the elements illustrated in Figures 5 and 6 being in positions different from those shown in Figure 4;

Figure 7 is a view of the rear of Figure 4;

Figure 8 is an end view looking in the direction of arrow VIII, Figure 7;

Figure 9 is a section on line IX—IX, Figure 7;

Figure 10 is a view of part of the apparatus which, for clarity, has been omitted from Figure 4;

Figure 11 is a section on line XI—XI, Figure 10;

Figure 12 is a broken side elevation of a long feed control unit which co-operates with the mechanism shown in Figures 4 to 11;

Figure 13 is an end view looking in the direction of arrow XIII, Figure 12;

Figure 14 illustrates a switch device which cooperates with one of two clutches illustrated in Figure 3, and Figure 15 is a circuit diagram illustrating the electrical connections between the electrically operated parts of the long feed mechanism.

Referring to the drawings, Figures 1 and 2 illustrate diagrammatically a paper feeding device in which continuous stationery 1, divided as usual into form lengths, is arranged to be fed in the direction of arrow 2 to and past an imprinting position at which printing is effected on the paper by imprinting elements 3. The manner of effecting imprinting is known in the art and will be described only briefly herein. The paper 1, during an imprinting operation, is moved continuously by paper-feeding elements 4 consisting of rotatable wheels provided with pins to engage in marginal perforations formed in the stationery. The linear speed of the paper 1 is such that it will determine the height of characters to be defined on the paper and character definition is, in known manner, effected by the styluses 3, the marking ends of which are reciprocated continuously as indicated by the double-headed arrow 5, Figure 2, the styluses during character definition receiving a succession of lengthwise impulses as indicated by the double-headed arrow 6, Figure 1, whereby the styluses 3 by impinging against a carbon or like tape 7, Figure 2, effect imprinting on the paper by impressing carbon dots thereon to define the desired characters.

The paper-feeding elements 4 are rotated by a chain 8 carried by sprockets 9 and 10 secured to spindles 11, 12. Also secured to spindle 11 is a gear wheel 13 which meshes with a gear wheel 14 secured to a cross shaft 15. The cross shaft 15 is driven through a pair of gear wheels 16, 17 of which the gear wheel 16 is secured to cross shaft 15 and gear wheel 17 is secured to a drive shaft 18.

The drive shaft 18 is supported by bearings 19, 20, Figure 3, and is arranged to be rotated by one or other of a first driving means and a second driving means. The first driving means comprises meshing gear wheels 21, 22 of which the gear wheel 21 is secured to a shaft 23 continuously rotated from the main shaft, not shown, of the machine. The gear wheel 22 is secured to a shaft element 24 to which is also secured one part of a slipping clutch. The expression "slipping clutch" when used herein is to be understood as referring to any form of clutch the driven element of which is capable of slipping relative to the driving element when an overload is applied to the driven element. The slipping clutch illustrated in the drawings is a magnetic clutch 25 provided with a drive plate 26 which is splined to the drive shaft 18. Thus, when the magnetic clutch 25 is energised, the driving plate 26 is attracted thereby and couples the drive shaft 18 to the first driving means 21, 22, 24, this driving means being arranged to transmit movement to the feeding elements 4 during imprinting operations.

Also for co-operation with the drive shaft 18 is a second driving means therefor comprising a gear wheel 27 secured to a shaft 28 which is also rotated continuously from the main drive of the machine, but at an angular velocity greater than that of the gear wheel 21 and shaft 23. Meshing with the gear wheel 27 is a gear wheel 29 secured to a sleeve 30 surrounding the drive shaft 18 and formed so as to be either integral with or secured to a second slipping clutch in the form of a magnetic clutch 31 provided with a drive plate 32. The drive plate 32 is also splined to drive shaft 18 so that, on energisation of the magnetic clutch 31, the drive plate is attracted thereby and connects the driving means 27, 28, 29 to the shaft 18.

During imprinting operations, the magnetic clutch 25 connects shafts 18 to the first driving means 21, 22, 23, but on receipt of a long feed initiating signal, which may be received as the result of the sensing of a record or as the result of a function of the machine, the long feed mechanism illustrated in Figures 4 to 15 is brought into operation. The first condition which will be considered is that of a long feed which is initiated as the result of the sensing of a record.

When as the result of the sensing of a record a long feed is to be initiated, a signal is applied, either by a flexible cable 33, Figure 10, or by an electrical impulse, to one arm 34 of a normally inactive rocking arm pivoted at 35 to a frame member 36. The frame member 36 is pivoted on a spindle 37 secured to and extending laterally from a frame plate 38, Figure 4, for a purpose to be described below. A second arm 39 of the rocking arm co-operates with a switch-actuating slide 40 and is arranged, on operation of the rocking arm by angular movement thereof, to the left as viewed in Figure 10, to effect closing of a normally open switch 41. The switch 41 is connected through a normally closed switch 42, Figures 10 and 15, and leads 43 passing through a plug and socket 44, with one of three solenoids 45, Figures 13 and 15, which control the operation of a control unit to determine the interval during which the magnetic clutch 32 can be rendered active. The solenoid 45 to be rendered active on closing of switch 41 is determined by a contact 46, Figure 15, carried by a disc 47 which is secured to or is integral with a further disc 48, Figure 11, the discs 47 and 48 being referred to below as a timing device. The contact 46, at appropriate times, makes electrical contact with one or other of three stationary brushes 49 each of which is electrically connected with one of the solenoids 45. When the switch 41 is closed and electrical connection is made between one of the brushes 49 and the brush contact 46 the appropriate solenoid 45 is energized. Thus the solenoid 45 to be energised will depend upon the angular position of the disc 47 at the time when the switch 41 is closed because the disc 47 is continuously rotatable with the feeding elements 4 through the medium of a gear wheel 50, Figures 1, 2 and 4.

Referring to Figures 12 and 13, when one of the solenoids 45 is energised its armature 51 effects rocking of a clutch trip lever 52 thereby to move the tooth 53 carried by the lever out of the path of the tail 54 of a clutch pawl 55 carried by a gear wheel 56, 56a, or 56b, as appropriate, of which rotation of gear wheel 56 is effected by a gear wheel 57 on a shaft 58. The three gear wheels 56, 56a, and 56b are all rotated continuously through a train of gears, the gearing being such that the gear wheel 56 carrying two pawls 55 can be clutched to a normally inactive cam shaft 59 to rotate the cam shaft once for two revolutions of the main shaft of the machine and the gear wheels 56b and 56a which respectively carry three and four pawls 55 will rotate normally inactive cam shafts 60, 61 for one revolution during three and four revolutions of the main shaft respectively. The control unit now being described is provided to control tripping of the long feed mechanism to be described below in a manner such that, when varying lengths of long feed are called for, the time taken to effect a long feed can be reduced to a minimum according to the length of the feed to be effected. If desired, however, all long feeds may be effected during a given predetermined interval arranged to accommodate the longest feed to be effected in which case only one cam shaft need be provided and all the appropriate trip cams can be fitted to the single shaft and, in this case, only one solenoid 45 will be required and the brush 46 and contacts 49 can be dispensed with.

Each of the cam shafts 59, 60, 61 is provided with a clutch dog 62, Figure 13, which is secured thereto and is engaged by a clutch pawl 55 when the trip lever 52 appropriated thereto is rocked by its solenoid 45 to permit engagement of the clutch pawl with the clutch dog. Each of the cam shafts 59, 60, 61 has secured thereto a clutch control cam 63, Figure 12, arranged to co-operate with a lever 64 pivoted on a spindle 65. Each lever 64 co-operates with a pin 66 carried by a vertically slidable bar 67 which, during upward movement thereof, effects operation of a flexible cable 68, Figures 7 and 12, to render active the normally inactive clutch-conditioning device. From Figure 13 it will be observed that operation of any one of the levers 64 will effect operation of the vertical slide 67 thereby to render active the clutch-conditioning device. Each of the shafts 59, 60, 61 also has secured thereto a plurality of cams such as cams 63a, 63b, to initiate signals which, in known manner, will operate mechanism to prevent operation of those parts of the machine which must be rendered inactive during a long feed operation. As an example of such operations there can be mentioned that, during a long feed, the record feeding mechanisms of the machine must be rendered inactive, as must the card stop if the records being fed are cards, and the sensing mechanism provided for the sensing of the records must be rendered ineffective to transmit data which may be sensed during a long feeding operation.

Referring to Figures 4 to 9 a signal transmitted by the flexible cable 68 is applied to one end of a rocking arm 69, Figure 7, the rocking arm being pivoted on a wheel supporting spindle 70 and supporting two feed pawls 71, 72 of which the first feed pawl 71 is normally urged by a spring 73 into co-operation with the teeth of a toothed wheel 74 movable angularly about the spindle 70. The second feed pawl 72 is provided for co-operation with the teeth of a second toothed wheel 75, Figure 8, and is normally held out of engagement with the teeth of the wheel 75 by one arm 76 of a pawl trip member which is secured to a rocking spindle 77 to which is also secured the armature 78 of a normally inactive solenoid to be described below. The arm 76 engages with a pin 79 extending laterally from the feed pawl 72 and urges the feed pawl to the inactive position thereof against the action of its spring 80. The toothed wheels 74 and 75 are restrained against movement counter-clockwise by spring detents 81. Also co-operating with the toothed wheel 74 is a setting pawl 82 secured to a setting spindle 83, Figures 4, 7 and 8, rockable in the frame 38.

When the flexible cable 68 moves the rocking arm 69 clockwise, as viewed in Figure 7, the feed pawl 71 moves the toothed wheel 74 in a clockwise direction by a one tooth increment and, in so doing, raises the setting pawl 82 to rock the setting spindle 83, counter-clockwise as viewed in Figure 7 and clockwise as viewed in Figure 4. Rocking of the setting spindle 83 moves a setting lever 84, Figures 4, 5 and 6, which is secured to the setting spindle 83, in a clockwise direction, as viewed in Figures 4 and 5. The upper edge of the setting lever 84 engages beneath a pin 85 extending laterally through a latching pawl 86 pivotally mounted on a rockable trip arm 87 pivoted on a spindle 88. The pin 85 also engages beneath a change-over arm 89 freely pivoted on the setting spindle 83, and, when the setting lever 84 is moved clockwise, in the manner described above, it raises the latch pawl 86 against the action of a spring 90, Figures 4 and 6, thereby causing the pin 85 carried thereby to rock the change-over arm 89 clockwise, as viewed in Figures 4 and 5, so that a projection 91, made of insulating material, on the change-over arm is moved from the position thereof shown in Figure 4 to the position shown in Figure 5 and, in so doing, effects operation of long feed initiating means formed by a change-over switch so that the normally closed contacts 92 of the change-over switch are opened and the normally open contacts 93 thereof are closed, as shown in Figure 5. The change-over switch 92, 93, as can be seen from Figure 15, controls the energisation and de-energisation of the magnetic clutches 25, 32 so that when the normally closed contacts 92 are open the magnetic clutch 25 is de-energised and the closing of the contacts 93 causes energisation of the magnetic clutch 32 thereby initiating a long feed operation.

In the normal position thereof the nose of the latch pawl 86 is resting, as shown in Figure 4, on the top of a toothed rack 94 which is secured to an arm 95 freely mounted on the spindle 88, the arm 95 and rack 94 being urged in a clockwise direction by a spring 96, Figures 5 and 6. When the latch pawl 86 is raised by the setting lever 84, as described above, it is moved out of engagement with the rack 94 and, under the influence of the spring 96, the upper end of the arm 95 is moved into co-operation with the second step 89a of three steps formed on a plate secured to the change-over arm 89, as shown in Figure 5. When the change-over arm 89 is latched as just described, the latch pawl 86, under the influence of its spring 90 drops into the first tooth 94a of the rack 94.

The disc 47 of the timing device is provided with a plurality of laterally extending abutments 97 of which only three are shown in Figure 4, the abutments 97 comprising circular pins the centres of which are located on a circle concentric with the axis of rotation of the discs 47, 48, the centres of the pins being so spaced around the circle as to determine the length of a long feed according to the position of a pin when a long feed is initiated.

The long feed is terminated by the appropriate one of the pins 97 being moved into engagement with the arm 98 of the trip arm 87. Engagement of the pin 97 with the arm 98 causes the trip arm 87 to be rocked counter-clockwise, as viewed in Figures 4, 5, and 6, and the latch pawl, at this time being engaged with the tooth 94a on the toothed rack 94, causes the rack 94 and the arm 95 also to be rocked counterclockwise so that the upper end of the arm 95 is disengaged from the change-over arm 89 thus permitting the change-over arm 89 to be restored to the position thereof shown in Figure 4 under the influence of a spring 99. When the pin 97 is moved out of engagement with the arm 98, the trip arm 87 is restored to the position thereof shown in Figures 4 and 6 in preparation for a further long feed operation.

Just after passing the arm 98 the pin 97 is moved into engagement with a stop element formed by a stop arm 100 secured to a rocking spindle 101 to which is also secured an arm 102 connected by a link 103 with an operating bar 104, Figure 12, supported for vertical movement and operable by a cam 105. A stop element control cam 105 is provided on each of the cam shafts 59, 60, 61 and each of the cams, in a manner similar to that described above with reference to the cams 63, is arranged to effect operation of the bar 104 thereby to effect lengthwise movement of the link 103 so that, just prior to a cam shaft on which a cam 105 is mounted being arrested, the stop arm 100 is raised out of the path of the pin 97 thereby to permit continued rotation of the disc 47. The disc 47 is freely mounted on a stub shaft 106, Figure 4, which is carried by a frame 107 pivoted at 108 to the frame 38. The frame 107 is provided with a slot 109 which permits angular adjustment of the frame about the axis of its pivot 108 so that one pair of discs 47, 48 can be removed from the stub shaft 106 and replaced with a similar pair of discs of either smaller or greater diameter as required for the control of long feed operations on forms of different lengths. The frame 107 after initial adjustment is located in position by any suitable known form of locating device as indicated by the reference 110, Figure 4.

When a pin 97 is in abutting relation with the stop arm 100, angular movement of the disc 47 is temporarily arrested and through the gear 50 meshing therewith also temporarily arrests movement of the feeding elements 4, the interval during which these parts are arrested being so determined as to ensure that the first magnetic clutch 25 is rendered fully effective to cause continued movement of the paper feeding elements at the predetermined linear speed of the paper immediately the stop arm 100 is moved out of the path of pin 77. It will be understood that the disc 47 during a long feed operation is being moved at a high angular velocity such as would tend to cause the pin 97 to rebound from the stop arm 100, and to maintain the pin in engagement with the stop arm, thereby to ensure that the paper-feeding elements 4 correctly locate the paper for the first line imprinting next to be effected, the magnetic clutch 25 is rendered partially effective so as to maintain the pin 97 in engagement with the stop arm 100. This is effected by the provision of a resistor 111, Figure 15, in circuit with the magnetic clutch 25. The resistor 111 is controlled by a normally closed switch 112, Figures 14 and 15, the switch being retained in the normally closed position thereof by a switch-actuating member 113 supported by an arm 114 secured to the rocking spindle 101 for angular movement therewith. Normally, therefore, the switch 112, being closed, shorts the resistor 111 thereby permitting the application of full potential to the magnetic clutch 25, but when the stop arm 100 is moved into the path of a pin 97, the switch 112 is opened so that the resistor then operates to permit the application to the clutch 25, 26 of a reduced potential sufficient to maintain the pin 97 in abutting relation with the stop arm 100.

As is well understood in the art, there are occasions when the items to be imprinted on forms exceed the capacity of the form and it is necessary on reaching the last line of a form to effect a long feed to the first item line on the next succeeding form. To accommodate this condition a long feed is signalled by an operating stud 115 carried by the disc 48, Figure 11, the stud 115 being moved by the disc 48 into engagement with a normally inactive rocking lever 116 pivoted on a spindle 117, Figure 10, supported by the frame 36, the spindle 117 normally being substantially co-axial with the spindle 88. The rocking lever 116 supports for movement therewith a laterally extending pin 118 which is located in a slot in a second normally inactive rocking arm 119 pivoted on a stub spindle 120 secured to the frame 36. The second rocking arm 119 is urged counter-clockwise, as viewed in Figure 10, by a spring 121 and in the normally inactive position thereof, shown in Figure 10, the step 122 on the rocking arm 119 is engaged by a trip lever 123, also pivoted on the spindle 117.

To prevent a long feeding operation being initiated by a signal applied to the arm 34 when a continuation form is required, the trip lever 123 is operated by a trip stud 130, Figure 11, which causes the tail of the trip lever to be moved out of engagement with the step 122 on the rocking arm 119 to be engaged by a step 122a on the rocking arm. This permits a second switch-actuating slide 124 to move to the right, as viewed in Figure 10, so that the normally closed switch 42 is opened and the switch 41, together with a further normally open switch 125, remains open. If, therefore, a long feed initiating signal is received by the arm 34 it is rendered ineffective to energise a solenoid 45, because the switch 42 is open, and no long feed is initiated until the operating lever 116 is operated by its trip stud 115.

On rocking of the operating lever 116 by the operating stud 115, the rocking arm 119 is moved clockwise, as viewed in Figure 10, and being in engagement with the second switch-actuated slide 124 moves the slide 124 to the left, as viewed in Figure 10, thereby returning the switch 42 to the closed condition thereof and also closing the normally open switch 41 and the normally open switch 125. Closing of the switch 125 energises a solenoid 126, Figure 7, provided with hold-on contacts 126a. On energisation of solenoid 126 the armature 78 therefor is moved clockwise, as viewed in Figure 7, thereby rocking spindle 77 so that the arm 76 of the pawl trip member permits the feed pawl 72 to be engaged with a tooth of the toothed wheel 75 and simultaneously a second arm 127 of the pawl tripping member is moved into engagement with a pin 128, Figure 7, extending laterally from the feed pawl 71 thereby to move the feed pawl 71 out of engagement with the teeth of the toothed wheel 74. Closing of the switch 41 initiates rotation of the appropriate cam shaft as above described so that, on receipt of a long feed initiating signal, the rocking arm 69 is moved, clockwise as viewed in Figure 7, and the feed pawl 72 rotates the toothed wheel 75 by a one tooth increment. A second setting pawl 129, Figure 8, co-operates with the toothed wheel 75 and the teeth of the wheel 75 are deeper than those of the wheel 74 so that, on angular movement of the wheel 75, the setting pawl 129 is lifted to an extent greater than that by which the setting pawl 82 is lifted by the wheel 74. The setting pawl 129 is also secured to the setting spindle 83, but, on being raised, effects angular movement of the setting spindle 83 to an extent greater than that by which it is moved on operation thereof by the setting pawl 82. Accordingly the setting lever 84 is raised by the spindle 83 to a position at which the outer end of the arm 95 is moved into co-operation with the third tooth 89b, Figure 5, of the change-over arm 89 and the change-over arm 89 is moved to the position thereof indicated in Figure 5 by chain lines. When the end of the latching arm 95 is engaged with the third step 89b the latch pawl 86 is engaged in the second tooth 94b of the two teeth provided thereon and with the parts in the positions just described it is necessary to effect two operations of the trip arm 87 in order to restore it to the normal position thereof as illustrated in Figure 4.

When the second of the pins 97 rocks the arm 98 of the trip arm 87, the rack 94 is restored by one position so that the change-over arm is located in the position shown in full line in Figure 5 and the latching pawl 86 is caused to engage with the tooth 94a on the rack. On engagement of the third pin 97 with the arm 98 of the trip arm 87 the latching pawl 86 restores the latching plate 94 to the starting position thereof, as shown in Figure 6, at which time the change-over arm 89 is also restored to the starting position thereof and the change-over switch is actuated to restore contact between the switches 92 thereof.

When the operating lever 116 is disengaged by stud 115 the rocking arm 119 is restored to the starting position thereof shown in Figure 10 and the switches 41, 125, and 42 are respectively restored to the normally open and closed positions thereof.

It will be understood that during a long feed operation to a continuation sheet it is necessary that the stop arm 100 be prevented from being interposed into the path of the first stud 97 and this is effected by a solenoid 131, Figures 4 and 15, which is energised by the closing of switch 125 and is provided with hold-on contacts 132, Figures 4 and 15. Energisation of the solenoid 131 causes the armature 133, Figure 4, which is carried by the stop arm 100 to be attracted thereto so that the arm 100 is retained in the inactive position thereof. The hold-on contacts 132 are opened by a cam 134 formed of insulating material and pivoted at 135. Operation of the cam to effect opening of contacts 132 is effected by the trip arm 87 when the trip arm is moved counter-clockwise by the pin 97 so that the stop is released by the solenoid 131 for operation in proper sequence by its link 103.

As is well understood in the art, it is necessary to ensure that a continuation long feeding operation is not effected when a total-taking operation is initiated and, to prevent a continuation long feed being effected at such a time, the frame 36 is connected by a link 136, Figures 4 and 10, with the armature 137 of a normally inactive solenoid 138, Figures 4 and 15. The solenoid 138 is energised by a switch, not shown, carried by the total-taking shaft, also not shown, operation of which is effected when a total-taking operation is initiated and, on energisation of the solenoid 138, the link 136 causes the frame 36 to be rocked, counter-clockwise as viewed in Figures 4 and 10, about the spindle 37 so that the rocking lever 116 and the trip lever 123 are raised out of the path of the operating and trip pins 115, 130. In the normal position of the frame 36 a lateral projection 139 is engaged by an adjustable stop 140, Figure 4.

The long paper feeding mechanism herein described is particularly adapted for use in a machine in which character definition is effected during linear movement of the web but, if desired, the mechanism can be readily adapted for use in machines arranged to effect imprinting at high speeds on a web which is stationary during an imprinting operation and is moved linearly between successive lines of imprinting.

It will also be understood that, in general, a timing device will be provided with a plurality of abutments 97 as described above, but there may be some instances when only one kind of long feed is required and in such an instance the timing device will be provided with only one abutment 97.

I claim:

1. Long paper feeding mechanism for record controlled machines comprising paper feeding elements to feed paper to and past an imprinting position, a rotatabe drive shaft connected with said elements to effect operation thereof, a first driving means to impart movement to the feeding elements through said drive shaft thereby to effect feeding of paper at a predetermined linear speed, a second driving means to impart movement to the feeding elements through said drive shaft thereby to effect a long feed by movement of the paper at a linear speed greater than said predetermined speed, a slipping clutch for each driving means to connect the driving means to the drive shaft, a rockable change-over arm connected with said clutches, a timing device rotatable by the drive shaft to effect operation of the change-over arm on receipt of a long feed initiating signal thereby to render the slipping clutch for the first driving means ineffective and the slipping clutch for the second driving means effective, and a stop adapted on termination of a long feed to be engaged by an abutment movable with said timing device thereby to arrest movement of the feeding elements for an interval during which the second driving means is rendered ineffective and the first driving means is rendered fully effective to cause movement of the paper feeding elements at said predetermined linear speed of the paper.

2. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a predetermined linear speed, a second driving means to impart movement to the feeding elements through said drive shaft thereby to effect a long feed by movement of the paper at a linear speed greater than said predetermined speed, a magnetic clutch for each driving means to connect the driving means to the drive shaft, a rockable change-over arm connected with said clutches, a timing device rotatable by the drive shaft to effect operation of the change-over arm on receipt of a long feed initiating signal thereby to render the magnetic clutch for the first driving means ineffective and the magnetic clutch for the second driving means effective, and a stop adapted on termination of a long feed to be engaged by an abutment movable with said timing device thereby to arrest movement of the feeding elements for an interval during which the second driving means is rendered ineffective and the first driving means is rendered fully effective to cause movement of the paper feeding elements at said predetermined linear speed of the paper.

3. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a linear speed which determines the height of characters defined on the paper, a second driving means to impart movement to the feeding elements through said drive shaft thereby to effect a long feed by movement of the paper at a linear speed greater than said first-mentioned linear speed, clutch means for each driving means to connect the driving means to the drive shaft, and a timing device operable on receipt of a long feed initiating signal to render the clutch means for the first driving means ineffective and the clutch means for the second driving means effective and on termination of a long feed to arrest movement of the feeding elements for an interval during which the second driving means is rendered ineffective and the first driving means is rendered fully effective to cause movement of the paper feeding elements at said first-mentioned linear speed of the paper.

4. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a linear speed which determines the height of characters defined on the paper, a second driving means to impart movement to the feeding elements through said drive shaft thereby to effect a long feed by movement of the paper at a linear speed greater than said first-mentioned linear speed, a magnetic clutch for each driving means to connect the driving means to the drive shaft, and a timing device operable on receipt of a long feed initiating signal to render the magnetic clutch for the first driving means ineffective and the magnetic clutch for the second driving means effective and on termination of a long feed to arrest movement of the feeding elements for an interval during which the second driving means is rendered ineffective and the first driving means is rendered fully effective to cause movement of the paper feeding elements at said first-mentioned linear speed of the paper.

5. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a predetermined linear speed, a second driving means to impart movement to the feeding elements through said drive shaft thereby to effect a long feed by movement of the paper at a linear speed greater than said predetermined speed, clutch means for each driving means to connect the driving means to the drive shaft, a plurality of normally inactive cam shafts, a continuously rotatable driving element for each cam shaft, a clutch to connect each said driving element to its cam shaft, normally inactive clutch-actuating means for each said clutch operable on receipt of a long feed initiating signal to connect its driving element to its cam shaft to effect rotation thereof, a selector device movable with the paper feeding elements and connected with the clutch-actuating means to determine which thereof is rendered active, a clutch control cam on each said cam shaft, a normally inactive clutch-conditioning device connected with each said clutch means and settable by said clutch control cams to render ineffective the clutch means for said first driving means and effective the clutch means for the second driving means, an abutment movable with the selector device to restore the clutch-conditioning means to the inactive condition thereof, a stop element movable into and out of the path of said abutment and arranged when engaged by the abutment to arrest movement of the feeding elements for an interval during which the second driving means is rendered ineffective and the first driving means is rendered fully effective to cause movement of the paper feeding elements at said predetermined linear speed of the paper, and a stop element control cam on each said cam shaft connected with said stop element to control operation thereof.

6. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a predetermined linear speed, a second driving means to impart movement to the feeding elements through said drive shaft thereby to effect a long feed by movement of the paper at a linear speed greater than said predetermined speed, electrically operable clutch means for each driving means to connect the driving means to the drive shaft, a plurality of normally inactive cam shafs, a continuously rotatable driving element for each cam shaft, a clutch to connect each said driving element to its cam shaft, a normally inactive clutch-actuating solenoid for each said clutch operable on receipt of a long feed inititating signal to connect its driving element to its cam shaft to effect rotation thereof, a selector device movable with the paper feeding elements and connected electrically with the clutch-actuating solenoids to determine which thereof is rendered active, a clutch control cam on each said cam shaft, a normally inactive clutch-conditioning device connected with each said electrically operable clutch means and settable by said clutch control cams to render ineffective the electrically operable clutch means for said first driving means and effective the electrically operable clutch means for the second driving means, an abutment movable with the selector device to restore the clutch-conditioning device to the inactive condition thereof, a stop element movable into and out of the path of said abutment and arranged when engaged by the abutment to arrest movement of the feeding elements for an interval during which the second driving means is rendered ineffective and the first driving means is rendered fully effective to cause movement of the paper feeding element at said predetermined linear speed of the paper, and a stop element control cam on each said cam shaft connected with said stop element to control operation thereof.

7. Long paper feeding mechanism according to claim 6, including an angularly movable spindle with which the stop element is movable, a switch and a resistor electrically connected with the electrically operable clutch means for said first driving means, and a switch-actuating member normally closing said switch and movable with said spindle to open the switch when the stop element is located for engagement by said abutment whereby said resistor allows the application of a reduced potential to the electrically operable clutch means for the first driving means to maintain the abutment in engagement with the stop element.

8. Long paper feeding mechanism according to claim 6, wherein the clutch-conditioning device comprises a rotatable toothed wheel, a wheel-supporting spindle supporting the toothed wheel for angular movement therewith, a feed pawl operable by a clutch control cam to move said wheel about said spindle by one wheel tooth increment, a setting spindle, a setting pawl secured to the setting spindle and operable by the teeth of said toothed wheel to effect rocking of the setting spindle, a normally inactive setting lever movable angularly with said setting spindle, a change-over switch in circuit with said electrically operable clutch means, a change-over arm movable by said setting lever to effect operation of the change-over switch, a toothed latching arm operable to engage a step of said setting lever to retain the lever in the active condition thereof in which the change-over switch is in the position thereof to render active the electrically operable clutch means for said second driving means, a trip arm supported for rocking movement by said abutment, and a latching pawl carried by the trip arm and engageable with a tooth of said latching arm to retain the change-over arm in the active condition thereof and disengaged from said tooth on rocking of the trip arm by said abutment thereby to permit restoration of the change-over switch to the normal position thereof in which the electrically operable clutch for said first driving means is rendered active.

9. Long paper feeding mechanism according to claim 8, including a second toothed wheel movable angularly about the wheel-supporting spindle, a second feed pawl to co-operate with the second toothed wheel and normally disengaged therefrom, a pawl-actuating member rockable simultaneously to disengage the feed pawl from said first wheel and to effect angular movement of the setting spindle through said second feed pawl by a one tooth increment of the second wheel thereby to move the setting lever to a position thereof at which two operations of the trip arm are required to restore the change-over switch to said normal position thereof, a pawl-actuating solenoid to effect operation of said pawl-actuating member, a trip solenoid operable to retain said stop element out of the path of said abutment during the passage of the abutment past the position of interpolation of the stop element into the path of the abutment, a long feed switch in circuit with said pawl-actuating and trip solenoids and operable simultaneously to render the solenoids active, and a long feed initiating member movable with the selector device to effect operation of the long feed switch.

10. Long paper feeding mechanism according to claim 9 including a first and a second normally open switch and a normally closed switch of which the first normally open switch through the normally closed switch controls operation of said clutch-actuating solenoids and the second normally open switch controls operation of said pawl-actuating and trip solenoids, a first switch-actuating slide cooperating with said first normally open switch to effect operation thereof, a second switch-actuating slide cooperating with each of said switches to effect operation thereof, a first normally inactive rocking arm operable on receipt of a long feed initiating signal to effect operation of said first slide to close the first normally open switch, and a second rocking arm operable on the application thereto of a long feed initiating signal to effect operation of said second slide to close both said normally open switches and to open said normally closed switch.

11. Long paper feeding mechanism according to claim 9, including a first and a second normally open switch and a normally closed switch of which the first normally open switch through said normally closed switch controls operation of said clutch-actuating solenoids and the second normally open switch controls operation of said pawl-actuating and trip solenoids, a first switch-actuating slide co-operating with said first normally open switch to effect operation thereof, a second switch-actuating slide co-operating with each of said switches to effect operation thereof, a normally inactive rocking arm operable on receipt of a long feed initiating signal to effect operation of said first slide to close the first normally open switch, a normally inactive rockable stepped arm to effect operation of said second slide to close both said normally open switches and to open said normally closed switch, a rocking lever connected with the stepped arm to effect rocking thereof, an operating lever connected with the rocking lever to be engaged with a step on the stepped arm thereby to retain the stepped arm in the active position thereof, a trip lever co-operating with the operating lever to disengage the operating lever from the stepped arm and permit restoration to the normal inactive position thereof, and an operating stud and a trip stud movable with said selector device respectively to actuate said operating lever and trip lever.

12. Long paper feeding mechanism according to claim 11, including a pivoted frame to support said switches and the operating elements therefor, and frame rocking means operable on receipt of a predetermined signal to rock said frame about its pivot thereby to move the operating and trip levers to a position at which the operating and trip studs are prevented from co-operating therewith.

13. Long paper feeding mechanism for record controlled machines, comprising paper feeding elements to feed paper to and past an imprinting position, a rotatable drive shaft connected with said elements to effect operation thereof, a first driving means to impart movement to the feeding elements through said drive shaft thereby to effect feeding of paper at a predetermined linear speed during imprinting operations performed thereon, a second driving means to impart movement to the feeding elements through said drive shaft thereby to effect a long feed by movement of the paper at a linear speed greater than said predetermined speed, electrically operable clutch means for each driving means to connect the driving means to the drive shaft, a cam unit including independently operable normally inactive cam shafts, a normally inactive clutch-conditioning device to render ineffective the clutch means for said first driving means and effective the clutch means for the second driving means, a clutch control cam on each said cam shaft to effect setting of the clutch-conditioning device, a selector disc unit supported for rotation with said feeding elements and co-operating with said clutch-conditioning device to select a cam shaft for operation, an abutment movable with the disc unit to restore the clutch-conditioning device to the inactive condition thereof, a stop element movable into and out of the path of said abutment and arranged when engaged by the abutment to arrest movement of the feeding elements for an interval during which the second driving means is rendered ineffective and the first driving means is rendered fully effective to cause movement of the paper feeding elements at said predetermined linear speed of the paper, and a stop element control cam on each said cam shaft connected with said stop element to control operation thereof.

14. Long paper feeding mechanism according to claim 13, including an angularly movable spindle with which the stop element is movable, a switch and a resistor electrically connected with the electrically operable clutch means for said first driving means, and a switch-actuating member normally closing said switch and movable with said spindle to open the switch when the stop element is located for engagement by said abutment whereby said resistor allows the application of a reduced potential to the electrically operable clutch means for the first driving means to maintain the abutment in engagement with the stop element.

15. Long paper feeding mechanism according to claim 14, wherein the clutch conditioning device comprises a rotatable toothed wheel, a wheel-supporting spindle supporting the toothed wheel for angular movement therewith, a feed pawl operable by a clutch control cam to move said wheel about said spindle by one wheel tooth increment, a setting spindle, a setting pawl secured to the setting spindle and operable by the teeth of said toothed wheel to effect rocking of the setting spindle, a normally inactive setting lever movable angularly with said setting spindle, a change-over switch in circuit with said electrically operable clutch means, a change-over arm movable by said setting lever to effect operation of the change-over switch, a toothed latching arm operable to engage a step of said setting lever to retain the lever in the active condition thereof in which the change-over switch is in the position thereof to render active the electrically operable clutch means for said second driving means, a trip arm supported for rocking movement by said abutment, and a latching pawl carried by the trip arm and engageable with a tooth of said latching arm to retain the change-over arm in the active condition thereof and disengaged from said tooth on rocking of the trip arm by said abutment thereby to permit restoration of the change-over switch to the normal position thereof in which the electrically operable clutch for said first driving means is rendered active.

16. Long paper feeding mechanism according to claim 15, including a second toothed wheel movable angularly about the wheel-supporting spindle, a second feed pawl to co-operate with the second toothed wheel and normally disengaged therefrom, a pawl-actuating member rockable simultaneously to disengage the feed pawl from said first wheel and to effect angular movement of the setting spindle through said second feed pawl by a one tooth increment of the second wheel thereby to move the setting lever to a position thereof at which two operations of the trip arm are required to restore the change-over switch to said normal position thereof, a pawl-actuating solenoid to effect operation of said pawl-actuating member, a trip solenoid operable to retain said stop element out of the path of said abutment during the passage of the abutment past the position of interpolation of the stop element into the path of the abutment, a long feed switch in circuit with said pawl-actuating and trip solenoids and operable simultaneously to render the solenoids active, and a long feed initiating member movable with the selector disc unit to effect operation of the long feed switch.

17. Long paper feeding mechanism according to claim 16, including a first and a second normally open switch and a normally closed switch of which the first normally closed open switch through the normally closed switch controls operation of said clutch-actuating solenoids and the second normally open switch controls operation of said pawl-actuating and trip solenoids, a first switch-actuating slide cooperating with said first normally open switch to effect operation thereof, a second switch-actuating slide co-operating with each of said switches to effect operation thereof, a first normally inactive rocking arm operable on receipt of a long feed initiating signal to effect operation of said first slide to close the first normally open switch, and a second rocking arm operable on the application thereto of a long feed initiating signal to effect operation of said second slide to close both said normally open switches and to open said normally closed switch.

18. Long paper feeding mechanism according to claim 17, including a first and a second normally open switch and a normally closed switch of which the first normally open switch through said normally closed switch controls operation of said clutch-actuating solenoids and the second normally open switch controls operation of said pawl-actuating and trip solenoids, a first switch-actuating slide co-operating with said first normally open switch to effect operation thereof, a second switch-actuating slide co-operating with each of said switches to effect operation thereof, a normally inactive rocking arm operable on receipt of a long feed initiating signal to effect operation of said first slide to close the first normally open switch, a normally inactive rockable stepped arm to effect operation of said second slide to close both said normally open switches and to open said normally closed switch, a rocking lever connected with the stepped arm to effect rocking thereof, an operating lever connected with the rocking lever to be engaged with a step on the stepped arm thereby to retain the stepped arm in the active position thereof, a trip lever co-operating with the operating lever to disengage the operating lever from the stepped arm and permit restoration to the normal inactive position thereof, and an operating stud and a trip stud movable with said selector disc unit respectively to actuate said operating lever and trip lever.

19. Long paper feeding mechanism according to claim 18, including a pivoted frame to support said switches and the operating elements therefor, and frame rocking means operable on receipt of a predetermined signal to rock said frame about its pivot thereby to move the operating and trip levers to a position at which the operating and trip studs are prevented from co-operating therewith.

20. Long paper feeding mechanism for record controlled machines, comprising paper feeding elements to feed paper to and from an imprinting position, a rotatable drive shaft connected with the feeding elements to effect operation thereof, a first and a second driving means respectively to effect operation of the drive shaft while imprinting operations are being performed on paper fed by the feeding elements and to effect a long feed of the paper, a magnetic clutch for each driving means to connect its driving means to the drive shaft, normally inactive long feed control means, a first actuating device co-operating with said control means and operable by a record initiated signal to render the control means active, a second actuating device co-operating with said control means and operable by a machine initiated signal to render the control means active, a selector device movable with the feeding elements and co-operating with said actuating devices to restore the control means to the inactive condition thereof, a normally inactive over-run preventative device rendered active by said control means and co-operating with the selector device to arrest movement of the feeding elements on termination of a long feed for a predetermined interval during which the first driving means is rendered fully effective to continue feeding movement of the feeding elements at the desired paper feeding rate thereof, and a delay mechanism incorporated in said control means and operable on actuation of said second actuating device to delay co-operation of the selector device with the over-run preventative device for a predetermined interval.

21. Long paper feeding mechanism according to claim 20, including a pivoted frame for said first and second actuating devices, and frame rocking means operable on receipt of a machine initiated signal to rock the frame about its pivot thereby to move said actuating devices to a position at which co-operation thereof with the selector device is prevented.

22. Long paper feeding mechanism for record controlled machines, comprising paper feeding elements to feed paper to and past an imprinting position, a rotatable drive shaft connected with said elements to effect operation thereof, a first and a second driving means respectively to effect operation of the drive shaft at a rate such that the feeding elements feed paper at a linear speed which determines the height of characters defined on the paper and to effect a long feed of the paper, an electrically operable clutch for each driving means to connect its driving means to the drive shaft, normally inactive long feed control means rendered active by a record- or by a machine-initiated signal to control operation of said clutches, and means operable on termination of a long feed operation to arrest the feeding elements for a predetermined interval during which the first driving means is rendered fully effective to continue feeding movement of the feeding elements at the desired paper feeding rate thereof.

23. Long paper feeding mechanism for record controlled machines, comprising paper feeding elements to feed paper to and past an imprinting position, a rotatable drive shaft connected with said elements to effect operation thereof, a first driving means normally coupled to the drive shaft to effect rotation thereof at a rate such that the feeding elements feed paper at a linear speed which determines the height of characters defined on the paper, long feed initiating means operable to uncouple the first driving means from the drive shaft, a second driving means coupled to the drive shaft by operation of the long feed initiating means and operable under control of the long feed initiating means to cause the paper feeding elements to feed paper at a linear speed greater than the speed thereof under control of the first driving means, and a timing device co-operating with the long feed initiating means to determine the interval during which the second driving means remains coupled to the drive shaft.

24. Long paper feeding mechanism for record controlled machines, comprising paper feeding elements to feed paper to and from an imprinting position, a rotatable drive shaft connected with the feeding elements to effect operation thereof, a first and a second driving means respectively to effect operation of the drive shaft while imprinting operations are being performed on paper fed by the feeding elements and to effect a long feed of the paper, a magnetic clutch for each driving means to connect its driving means to the drive shaft, normally inactive long feed control means rendered active by a record initiated signal to control the magnetic clutches and transfer motive power for the drive shaft from the first to the second driving means, a selector device movable with the feeding elements and co-operating with said control means to restore them to the inactive condition thereof thereby to determine the extent of a long feed, a normally inactive over-run preventative device rendered active by said control means and co-operating with the selector device to arrest movement of the feeding elements on termination of a long feed for a predetermined interval during which the first driving means is rendered fully effective to continue feeding movement of the feeding element at the desired paper feeding rate thereof, a resistor electrically connected with the magnetic clutch for the first driving means and a switch operable by the rendering active of said over-run preventative device thereby to put the resistor in circuit with said magnetic clutch to allow the application of a low potential to the clutch and maintain said co-operation between the over-run preventative device and the selector device.

References Cited in the file of this patent
UNITED STATES PATENTS
2,747,717    Cunningham et al. _____ May 29, 1956